Oct. 19, 1965     J. E. FLOOD ET AL     3,213,201
MULTIPLEX TRANSMISSION SYSTEMS
Filed July 2, 1962                          6 Sheets-Sheet 1

FIG. 6.
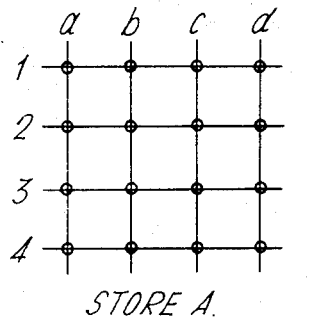
STORE A.
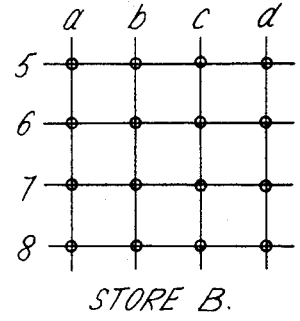
STORE B.
| STORE A. | | STORE B. | |
|---|---|---|---|
| READ | WRITE | READ | WRITE |
| — | a1,a2,a3,a4, | a8,b8,c8,d8, | — |
| b1,c1,d1,a1, | — | — | a5,a6,a7,a8, |
| — | b1,b2,b3,b4, | b5,c5,d5,a5, | — |
| c2,d2,a2,b2, | — | — | b5,b6,b7,b8, |
| — | c1,c2,c3,c4, | c6,d6,a6,b6, | — |
| d3,a3,b3,c3, | — | — | c5,c6,c7,c8, |
| — | d1,d2,d3,d4, | d7,a7,b7,c7, | — |
| a4,b4,c4,d4, | — | — | d5,d6,d7,d8, |
FIG. 7.

United States Patent Office 3,213,201
Patented Oct. 19, 1965

3,213,201
MULTIPLEX TRANSMISSION SYSTEMS
John Edward Flood and David Ian Urquhart-Pullen, London, England, assignors to Associated Electrical Industries Limited, London, England, a British company
Filed July 2, 1962, Ser. No. 206,808
Claims priority, application Great Britain, July 7, 1961, 24,695/61
7 Claims. (Cl. 179—15)

This invention relates to multiplex transmission systems in which a number of independent signals are transmitted over a single transmission path.

The invention has an important application inter alia in multiplex telephone systems for transmitting speech signals. It is also applicable to systems transmitting information other than telephone signals such, for example, as video signals and data signals. It is applicable to transmission over lines including concentric lines and waveguides and also to transmission over radio links.

In multiplex systems as employed hitherto it has been common practice to transmit the signals in frequency division multiplex in which a separate carrier wave having a different frequency is provided for the transmission of each signal. Such a system requires a large number of carrier frequency generators and a corresponding number of tuned receivers.

An alternative method also in use is to employ time division multiplex in which the medium of transmission is connected to each of the signals in rapid recurrent succession by switching means. With such arrangements, however, there is a limit to the number of channels since the sampled signals must be sufficiently time spaced to avoid cross talk.

In Flood et al.'s prior application which has issued as Patent No. 3,084,222, an improved arrangement is disclosed according to which as the transmitter signals from a plurality of channels are written successively into a store in successive parallel rows so that signals of each channel are aligned laterally, the signals are then read in lateral sweeps and transmitted in bursts of each channel. This reduces cross talk between channels as it is only necessary to provide pulse clearance between the bursts. However, in order to ensure continuity of operation it is necessary to employ two stores so that while signals are written in to one store they are read from the other store. This means that the same signals are held by two stores alternately and if the stores are not identical a modulation may be superimposed on the transmission resulting from the variation in the two stores.

The main object of the invention is to provide an improved arrangement of this kind which avoids such modulation.

The present invention comprises a multiplex transmission system which includes a plurality of stores at the transmitter and receiver together with switching means whereby the signals of a number of channels can be written into a transmitter store and then read out in a recurring sequence for transmission to the receiver where they are written into a receiver store and then distributed to the respective channels, the stores at the transmitter and receiver each comprising a plurality of storage elements arranged effectively in matrix form, writing being effectively in columns (or rows) and the time spacing being substantially uniform so that signals of the respective channels appear and are read effectively in rows (or columns) and so that at the transmitter bursts of signals of each channel are transmitted in a recurring sequence while at the receiver the transmitted signal bursts are recorded in receiver storage elements in like column or row formation and the switching apparatus being further arranged so that in each store the writing of a line along one co-ordinate direction alternates with reading of a line along the other co-ordinate direction and so that the stores are operated in a recurring sequence such that while one is reading another is writing and in which the channels are arranged in groups such that all the channels of a group are associated with a particular store at the transmitter and with a particular store at the receiver.

With such an arrangement, since there are alternate writing and reading line scans it is possible to ensure that any particular channel is always stored by the same transmitter and receiver tubes and thereby substantially avoids the noise due to switching when frame scanning is employed.

The storage elements may comprise separate areas of the same storage device, e.g. of a cathode ray tube screen. Alternatively the storage elements may comprise separate storage devices, e.g. capacitors.

In the latter case the devices need not be physically arranged in row and column formation provided the switching is so arranged that writing and reading are effectively in rows and columns. Preferably there are a pair of storage devices at the transmitter and another pair at the receiver and the switching means is so arranged that when one tube of each pair is reading the other is writing and the operations are then interchanged.

The switching at the receiver can be synchronised with the transmitter switching by transmitting appropriate line and frame synchronising pulses.

The storage of each signal is continued for a substantial time which may be as long as desired with the limitation in practice that the delay introduced thereby must not cause annoyance to the person receiving the signal. As an example in the case of person to person telephone conversations the delay could be of a few milliseconds in duration.

The invention also comprises a multiplex transmitter for use in the above multiplex system which transmitter comprises a plurality of stores together with switching means whereby the signals of a number of channels can be written into a store and then read out in a recurring sequence for transmission, the stores each comprising a plurality of storage elements arranged effectively in matrix form, writing being effectively in columns (or rows) and the time spacing being substantially uniform so that signals of the respective channels appear and are read effectively in rows (or columns) so that bursts of signals of each channel are transmitted in a recurring sequence and the switching being so arranged that in each store the writing of a line along one co-ordinate direction alternates with reading of a line along the other co-ordinate direction and so that the stores are operated in a recurring sequence such that while one is reading another is writing and in which the channels are arranged in groups such that all the channels of a group are associated with the same store.

The invention further comprises a receiver for use in the above multiplex system which receiver comprises a plurality of stores each comprising a plurality of storage elements arranged effectively in matrix form writing being effectively in columns or rows whereby bursts of received signals of the various channels received in a recurring sequence are written along one co-ordinate axis and read along the other co-ordinate axis and distributed to the respective receivers, the stores being operated in a recurring sequence so that while one is reading another is writing and the channels being arranged in groups such that all the channels of a group are associated with a particular store.

In order that the invention may be more clearly understood reference will now be made to the accompanying drawings, in which:

FIG. 1 shows diagrammatically the arrangement of the store matrix,

FIG. 2 similarly shows the arrangement at the receiver,

Figure 5:
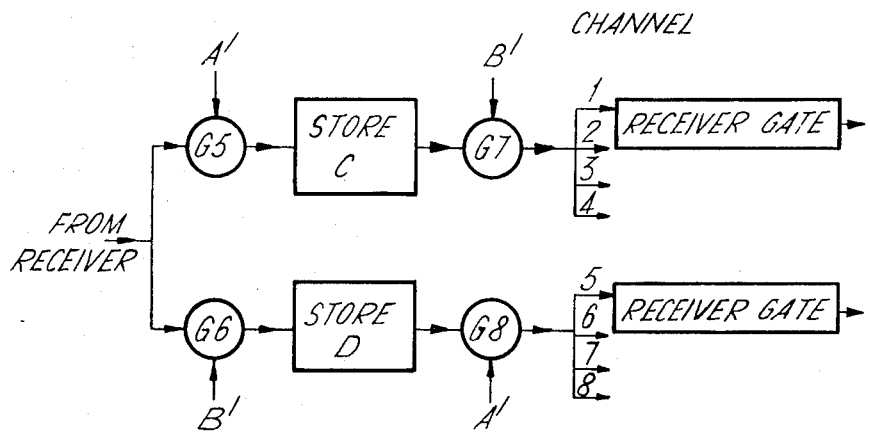

FIG. 5 similarly shows the store switching arrangement at the receiver,

FIG. 6 shows for purposes of explanation a store matrix having four rows and four columns.

Figure 8:
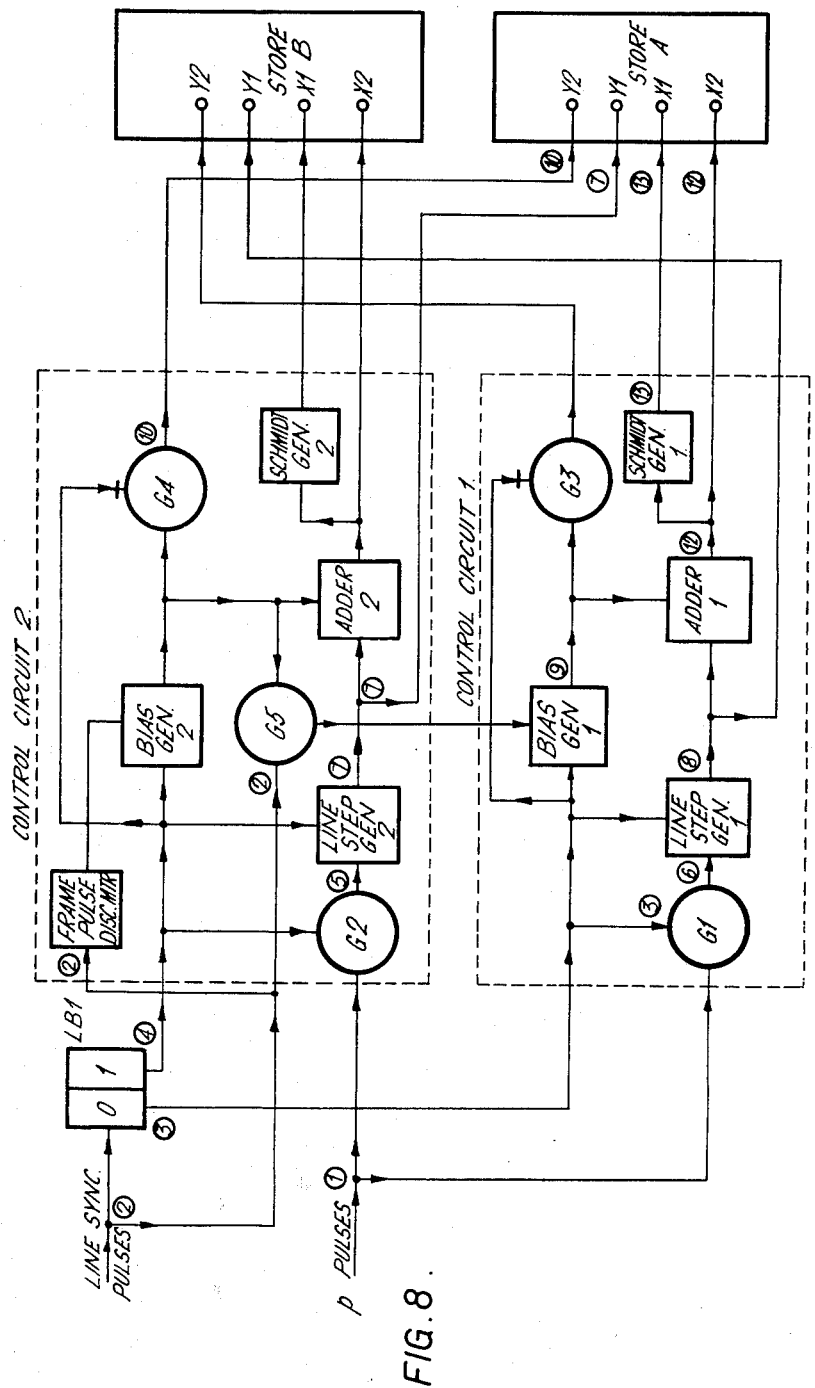
Figure 9:
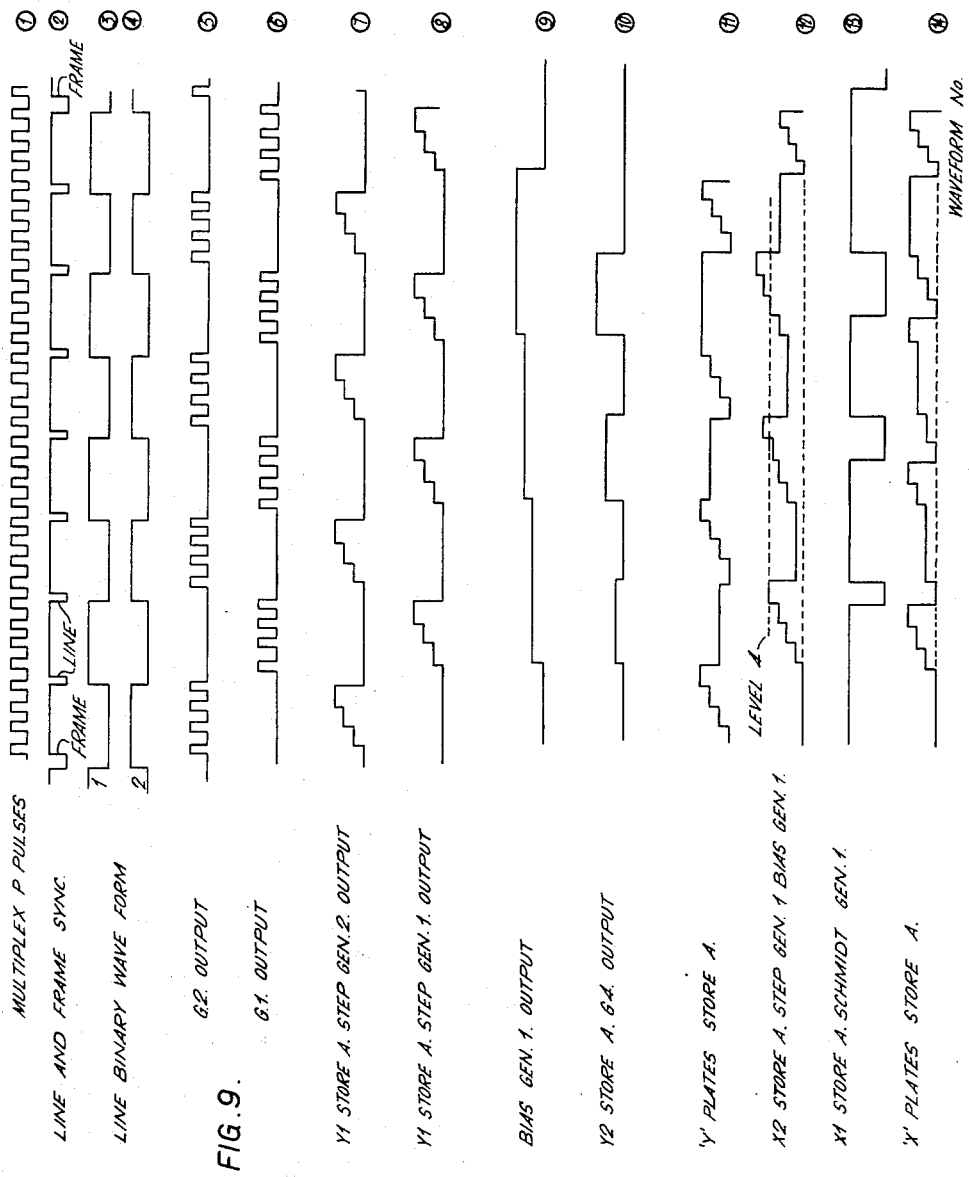
Figure 10:
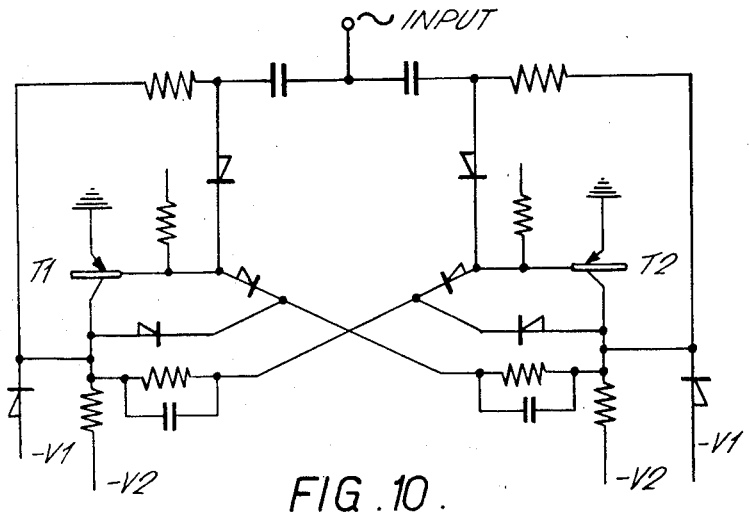
Figure 11:
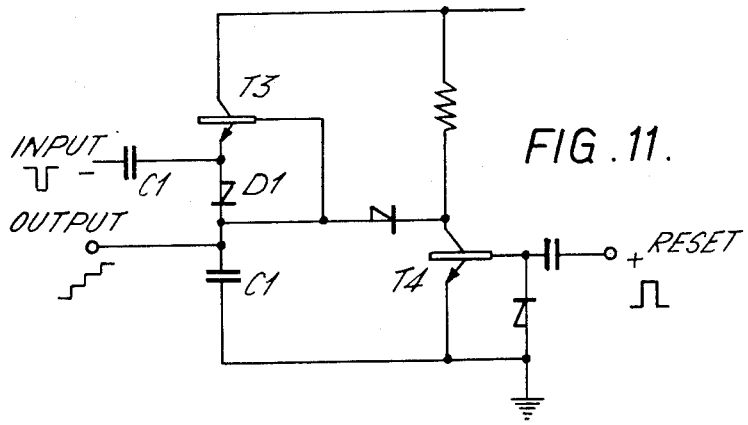
Figure 12:
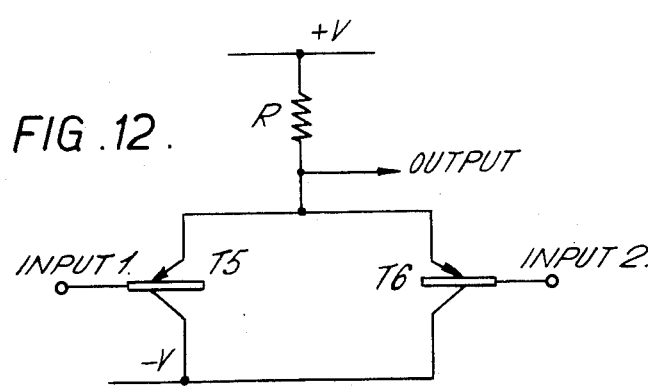

FIG. 7 shows a switching sequence for the matrix shown in FIG. 6,

FIG. 8 shows in block form a scanning waveform generator,

FIG. 9 shows graphically the voltages produced at various points in the generator shown in FIG. 8, FIG. 10 shows an example of a circuit arrangement of a suitable bistable counter circuit, FIG. 11 shows an example of a circuit arrangement of a step generator, and FIG. 12 shows an example of an adding circuit.

In the following description it will, for convenience, be assumed that at the transmitter writing will be carried out in columns and reading in rows and at the receiver writing effected in rows and reading in columns. It will be understood, however, that converse arrangements could equally well be employed.

Figure 1:
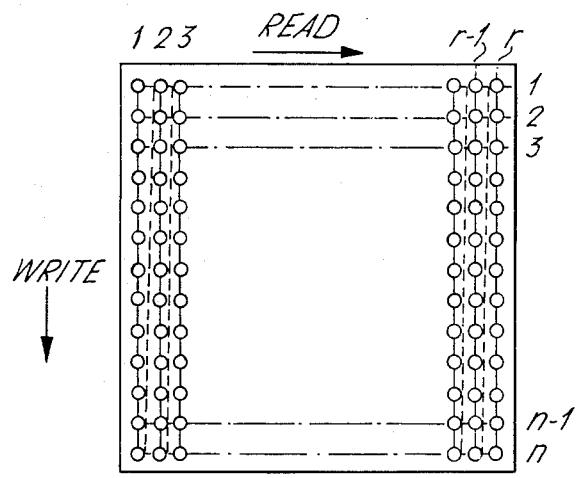

FIG. 1 shows the arrangement of a raster at the transmitter in which, as above mentioned, it is assumed that writing is carried out in vertical sweeps down each of the columns in turn from left to right. During writing sample signals from each of the sources are written in turn into the store, the writing being sequentially downwards and the displacement between samples being uniform so that in each row of the raster all the signals will be associated with the same channel.

Figure 2:
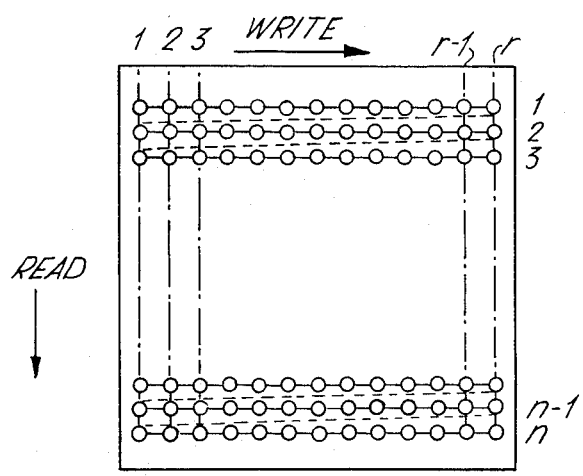

The writing of a line is followed by reading of a line in which the storage tube is scanned horizontally. Reading and writing alternate in a manner which will be described subsequently. Since each row contains signals of the same channel the result will be that a short train of signals from each of the channels in turn will be transmitted and therefore the separate impulses in a train can be closer together in time than in an equivalent T.D.M. system as any interaction between the pulses during transmission cannot cause cross talk with another channel's pulses. In this way it is possible to transmit a larger number of channels over a transmission system than could be transmitted by an equivalent T.D.M. system having the same cross talk factor. Correspondingly at the receiver writing of the received trains of signals is effected horizontally according to the raster shown in FIG. 2 and reading is then carried out vertically and the signals are distributed to the appropriate receivers in the form of recurrent impulses.

Figure 3:
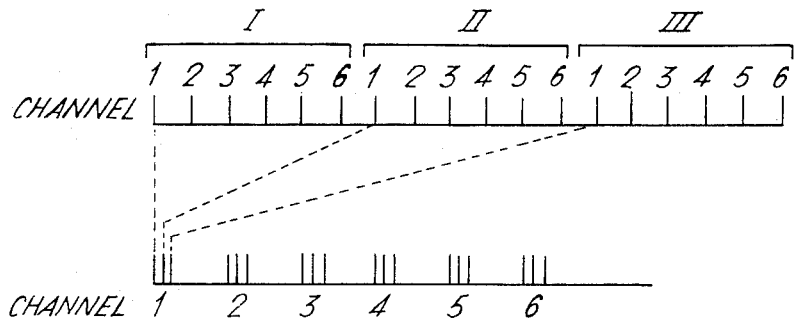
FIG. 3 is an explanatory figure explaining the operation of FIG. 1.

FIG. 3 is an explanatory figure which illustrates the compression result obtained, the upper part of the figure showing the effect of transmitting sample signals of six channels in the form of recurrent impulses. In the figure there are shown three successive impulses of each channel. In the upper part of the figure the groups are indicated by the references I, II, III. Since each sample is adjacent to a sample from a different channel it is necessary to provide adequate time spacing between successive impulses in order to avoid cross talk. If however, the sample impulses are arranged in successive trains of signals, as shown in the lower part of the figure, it is only necessary to provide the time spacing to avoid cross talk between adjacent signal trains and hence an appreciable economy in time space can be obtained as the signal trains may be time compressed provided they are adequately separated from adjacent signal trains of other channels.

Figure 4:
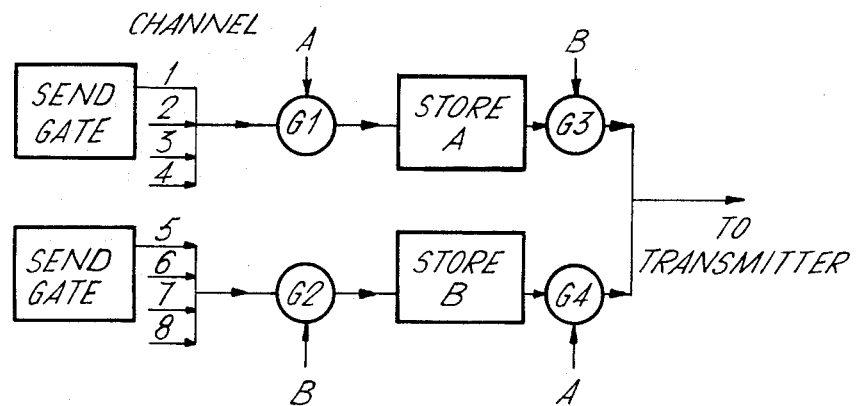
FIG. 4 shows in block form the store switching arrangement at the transmitter.

FIG. 4 illustrates in block form the store switching arrangement at the transmitter. For purposes of explanation it will be assumed that there are only eight channels, though clearly in practice there would be an appreciably greater number. Half of the input channels, i.e. channels 1–4 in the example considered, are fed through associated send gates on the left of the figure and gate G1 to store A, the send gates being operated sequentially so that each channel in turn is connected to the store. Similarly the remaining channels, i.e. channels 5 to 8, are connected through send gates and gate G2 with store B. Stores A and B read and write alternately during successive line scans and are controlled by the gates G1, G2, G3 and G4. Control signals A and B are applied alternately to the gates so that opening of gates G1 and G4 alternates with G2 and G3. When G1 and G4 are open during one line scan, a column of incoming signals is fed through gate G1 and written into store A. At the same time a row of signals in store B is read and fed through the gate G4 to the transmission path. At the end of the line scan, signal A is removed and signal B applied. Gates G3 and G2 will now be opened and G1 and G4 blocked. Thus a row of information in store A will be read out and transmitted while at the same time a column of information is being written into store B.

FIG. 5 shows a corresponding arrangement at the receiver which operates in a similar manner. Store C is associated with channels 1 to 4 and store D with channels 5 to 8. The incoming signals are fed alternately into store C and store D, whilst information is being written into store C and information is being read out from store D and passed through the appropriate receiver gates associated with the respective channels. The control is obtained by means of signals A' and B' which control the gates G5, G6, G7 and G8. The signals A' and B' are approximately synchronised with signals A and B at the transmitter and it follows that with the arrangement shown each transmitter store will always transmit signals to the same receiver store.

It will be understood that unless the raster is square it will be necessary to have different line and frame scan speeds during reading to the speeds used during writing.

An important advantage of the present invention is the avoidance of noise in the transmission and this is achieved by so arranging the transmitter and receiver that the same channels always are written on to the same store, this avoids the noise caused by switching from one store to the other such as is liable to occur if the writing occurs frame by frame.

FIG. 6 shows a matrix employing four rows and four columns for purposes of explanation and the subsequent figures are based on this matrix. It will be observed that the columns are designated by small letters and the rows by numerals.

FIG. 7 shows the sequence of switching.

In FIG. 6 a column is written on store A whilst a row is read from store B and then a row is read from store A whilst a column is written into store B. Thus, in each store there is alternate writing of a column and reading of a row. In order, however, that the reading scan shall not try to read a store position before any information has been written into it, it is necessary to stagger the reading so that the reading of a row commences at the column following that column which has just been written and finishes up at the column which has just been written.

FIG. 8 shows the control circuit for feeding the deflection systems of the stores; it does not show the information circuitry. The circuits for feeding the two stores are enclosed in the dotted lines. It will be noted that there are two output leads for each of the deflection direction systems of each store. At the top left hand corner LB1 is a line binary counter which operates the gates G1, G2 so that these are alternately made operative to pass $p$ pulses i.e. clock pulse to the control circuit concerned.

FIG. 9 shows graphically the voltage changes occurring in FIG. 8 and the numerals in circles in FIG. 8 refer to the graphs in FIG. 9 as showing the voltage changes at these points. The $p$ pulses at the top line of the graph control the rate of stepping and are fed to both G1 and G2. Considering control circuit 1 the output from G1 is shown in graph 6 and consists of a series of pulses which occur whilst LB1 is applying the upper voltage level shown in graph 3. These are applied to the line step generator which generates an output as shown in graph 8. This is supplied to the adder. At the same time the bias step generator applies a voltage which, as shown in graph 9, is increased after each line cycle, i.e. a column of writing followed by a row of reading (or vice versa).

This bias voltage is also supplied to the adder and has the effect of raising the stepped output in the manner shown in graph 12 so that the stepped output reaches a level 4 (shown dotted) more quickly and at this level triggers the Schmidt generator 1. The output of the Schmidt generator is shown in graph 13 and this is applied to one side of the X deflection system, i.e. to X1, whilst the stepped voltage shown in graph 12 is applied to the other, i.e. to X2. The resultant deflection produced is shown in the graph 14.

It is pointed out that the actual adding of graphs 12 and 13 is done by the deflection system. The bias voltage causes the stepped waveform to be moved along one step after each line cycle. The bias step generator, as above explained, moves upwards one step for each line cycle and when it has reached level 4 it has to be re-set. Control circuit 2 is similar to control circuit 1 excepting that in FIG. 8 the bias step generator 2 is re-set directly by frame sync. pulses passed through the discriminator. Bias step generator 1 is, however, triggered by a selected line sync. pulse passed through the gate G5 to which gate are also applied the voltage levels from the bias generator 2. When bias generator 2 is at level 4 then a line sync. pulse is allowed to pass through the gate G5 to re-set bias generator 1.

The output from G4 is shown in graph 10 and consists of three wide pulses whose amplitudes increase by equal increments, interspersed with gaps of equal width to the pulses. This waveform 10 is produced by passing the output of bias generator 2 and the line binary waveform 2 through gate G4. It is applied to one side of the Y deflection system of store A. The output 7 from the line step generator 2 is applied to the other side of the Y deflection system of store A and the resultant combined waveform is shown in graph 11. Once again the actual adding of graphs 7 and 10 is accomplished by the actual storage tube deflection system.

FIG. 10 shows a bistable counter circuit which may be used for LB1. This comprises two transistors T1 and T2 connected in grounded emitter and cross connected through resistance-capacitance networks in a well known manner.

FIG. 11 shows one form of step generator. This employs transistors T3 and T4. The stepped voltage waveform is built up across C2 and appears at the output terminal. A step is produced each time a negative $p$ pulse is applied to the input terminal and hence to the emitter of T3 which conducts temporarily charging C2. When the input pulse collapses D1 conducts and transfers the charge from C1 to C2. Reset pulses applied to the reset terminal discharge C1 through T4.

FIG. 12 shows an example of an adder circuit. This comprises two transistors T5 and T6 connected in parallel with a common emitter resistor R. The voltage at the output will clearly be the algebraic sum of the input voltages.

Whilst in the above specific description it has been assumed that each store comprises a single store separate areas of which comprise storage elements it will be appreciated that the storage devices may comprise separate elements such as capacitors.

What we claim is:

1. A multiplex transmission system including a transmitter and a receiver, said transmitter including at least two matrix type stores, means for writing signals from a first plurailty of channels sequentially into one of said stores, means for writing signals from a second plurality of channels sequentially into a second store, means whereby said signals are written into the store in lines along one direction so that signals of each channel are stored in respective lateral lines, means for transmitting signals stored in said lateral lines sequentially to transmit sucessive bursts of each channel signal, switching means whereby in each store the operation of writing a line of signals alternates with reading of a lateral line, and switching means whereby writing of a line in one store occurs simultaneously with reading of a line in the other store, said receiver including at least two stores, each comprising a plurality of storage elements in matrix form, means for writing signals from said first plurailty of channels into a first store and means for writing signals from said second plurality of channels into a second store, means whereby said received signal bursts are written into said stores in lines along one direction and means for scanning said lines laterally and distributing the signals read from the stores to respective receivers and switching means whereby the operation of writing a line along one direction alternates with reading of a line along a lateral direction and whereby the wiring of a line in one store occurs simultaneously with the reading of a line in the other store.

2. A multiplex transmission system including a transmitter and a receiver, said transmitter including at least two matrix-type stores each having a storage surface, means for writing signals from a first plurality of channels sequentially into one of said stores and means for writing signals from a second plurality of channels sequentially into a second store, means whereby signals are fed into said stores in lines along one direction of the storage surface so that signals of each channel are stored in respective lateral lines, means for transmitting signals stored in said lateral lines sequentially to transmit successive bursts of each channel signal, switching means whereby in each store the operation of writing a line of signals alternates with reading of a lateral line, said receiver including at least two stores each comprising a plurality of storage elements in matrix form, each having a storage surface, means for writing signals of said first plurality of channels into said first store and means for writing signals of said second plurality of channels into a second store, means for writing received signal bursts into said stores in lines along one direction of the storage surface and means for scanning said lines laterally and distributing the signals read from the store to respective receivers and switching means whereby the operation of writing a line along one direction alternates with reading of a line along a lateral direction and means whereby the writing of a line in one store occurs simultaneously with the reading of a line in the other store.

3. A multiplex transmission system including a transmitter and a receiver, said transmitter including at least two matrix-type stores, means for writing signals from a first plurality of channels sequentially into a first store, means for writing signals from a second plurality of channels sequentially into a second store, means whereby the signals are fed into said stores in lines along one direction so that signals of each channel are stored in respective lateral lines, means for transmitting signals stored in said lateral lines sequentially to transmit successive bursts of each channel signal, switching means whereby in each store the operation of writing a line of signals alternates with reading of a lateral line, and switching means whereby writing a line in one store coincides with reading a line in the other store said receiver including at least two stores each comprising a plurality of storage elements in matrix form, means for writing signals of said first plurality of channels into said first store and means for writing signals of said second plurality of channels into a second store, means for writing the received signal bursts into said stores in lines along one direction and means for scanning said lines laterally and distributing the signals read from the store in respective receivers and switching means whereby the operation of writing a line along one direction alternates with reading of a line along a lateral direction and switching means whereby writing a line in one store occurs simultaneously with the reading of a line in the other store.

4. In a multiplex transmission system, a transmitter including at least two matrix-type stores, means for writing signals from a first plurality of channels into one of said stores, means for writing signals from a second plurality of channels into a second store, means whereby said signals are fed sequentially into said stores in lines along one direction so that signals of each channel are stored in respective lateral lines, means for transmitting signals stored in said lateral lines sequentially to transmit successive bursts of each channel signal, switching means whereby in each store the operation of writing a line of signals in one direction alternates with reading of said lateral line of stored signals and means whereby writing of a line in one store coincides with reading of a line out of the other store.

5. In a multiplex transmission system, a transmitter including at least two matrix-type stores, means for writing signals from a plurality of channels into one of said stores, means for writing signals from a second plurality of channels into a second store, means whereby said signals are fed sequentially into said stores in lines along one direction so that signals of each channel are stored in respective lateral lines, means for transmitting signals stored in said lateral lines sequentially to transmit successive bursts of each channel signal, switching means whereby in each store the operation of writing a line of signals alternates with reading of a lateral line of stored signals, and switching means whereby writing of a line in one store occurs simultaneously with the reading of a line in the other store.

6. In a multiplex transmission system including a transmitter transmitting bursts of signals of each channel in a recurring sequence, a receiver including at least two stores each comprising a plurality of storage elements in matrix form, means for writing signals from a first plurality of channels into one of said stores and means for writing signals from a second plurality of channels into a second store, means for writing the received signal bursts into said stores on lines along one direction and means for scanning said lines laterally and distributing the signals read to respective receivers and switching means whereby writing of a line along one direction alternates with reading along a lateral direction and means whereby writing of a line in one store coincides with the reading of a line in the second store.

7. In a multiplex transmission system a transmitter including at least two matrix-type stores, means for writing signals from a first plurality of channels into one of said stores, means for writing signals from a second plurality of channels into a second store, means whereby said signals are fed sequentially into said stores in lines along one direction so that signals of each channel are stored in respective lateral lines, means for transmitting signals stored in said lateral lines sequentially to transmit successive bursts of each channel signal, switching means whereby in each store the operation of writing a line of signals alternates with reading of a lateral line of stored signals, and switching means whereby writing of a line in one store occurs simultaneously with the reading of a line in the other store, means for applying stepped voltages to signals to said stores to effect line scans and means for simultaneously applying bias voltages to cause scanning of each line to start on an element in the next transverse line.

References Cited by the Examiner

UNITED STATES PATENTS

| 2,640,881 | 6/53 | Veaux | 179—15 |
| 3,084,222 | 4/63 | Foot et al. | 179—15 |

DAVID G. REDINBAUGH, *Primary Examiner.*